(12) United States Patent
Barnes et al.

(10) Patent No.: US 11,080,833 B2
(45) Date of Patent: Aug. 3, 2021

(54) IMAGE MANIPULATION USING DEEP LEARNING TECHNIQUES IN A PATCH MATCHING OPERATION

(71) Applicant: Adobe Inc., San Jose, CA (US)

(72) Inventors: Connelly Barnes, Seattle, WA (US); Utkarsh Singhal, Berkeley, CA (US); Elya Shechtman, Seattle, WA (US); Michael Gharbi, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 70 days.

(21) Appl. No.: 16/692,843

(22) Filed: Nov. 22, 2019

(65) Prior Publication Data

US 2021/0158495 A1 May 27, 2021

(51) Int. Cl.
| | |
|---|---|
| *G06T 5/50* | (2006.01) |
| *G06K 9/62* | (2006.01) |
| *G06T 5/00* | (2006.01) |
| *G06N 3/04* | (2006.01) |

(Continued)

(52) U.S. Cl.
CPC ............... *G06T 5/50* (2013.01); *G06F 16/53* (2019.01); *G06K 9/6201* (2013.01); *G06N 3/0454* (2013.01); *G06N 3/08* (2013.01); *G06T 5/002* (2013.01); *G06T 2207/20081* (2013.01); *G06T 2207/20084* (2013.01)

(58) Field of Classification Search
CPC ............... G06T 5/50; G06T 5/001–007; G06T 2207/20081–20084; G06T 2207/30201; G06T 2209/6213; G06F 16/53; G06N 3/0454; G06N 3/08; G06N 3/0481; G06N 3/084; G06N 3/088; G06K 9/6201; G06K 9/6256; G06K 9/4628; G06K 9/00228; G06K 9/00362; G06K 9/3241; G06K 9/46; G06K 9/6215; G06K 9/6267; G06K 9/629; G06K 9/00288; G06K 9/3233; G06K 9/4671; G06K 9/627; G06K 9/00268; G06K 9/00281
See application file for complete search history.

(56) References Cited

U.S. PATENT DOCUMENTS

| | | | |
|---|---|---|---|
| 9,098,741 B1 * | 8/2015 | Anguelov | G06K 9/3241 |
| 9,940,551 B1 * | 4/2018 | Mordvintsev | G06K 9/6271 |
| 10,467,526 B1 * | 11/2019 | Appalaraju | G06K 9/6256 |

(Continued)

*Primary Examiner* — Michael S Osinski
(74) *Attorney, Agent, or Firm* — Kilpatrick Townsend & Stockton LLP

(57) ABSTRACT

A method for manipulating a target image includes generating a query of the target image and keys and values of a first reference image. The method also includes generating matching costs by comparing the query of the target image with each key of the reference image and generating a set of weights from the matching costs. Further, the method includes generating a set of weighted values by applying each weight of the set of weights to a corresponding value of the values of the reference image and generating a weighted patch by adding each weighted value of the set of weighted values together. Additionally, the method includes generating a combined weighted patch by combining the weighted patch with additional weighted patches associated with additional queries of the target image and generating a manipulated image by applying the combined weighted patch to an image processing algorithm.

20 Claims, 5 Drawing Sheets

(51) Int. Cl.
*G06F 16/53* (2019.01)
*G06N 3/08* (2006.01)

(56) References Cited

U.S. PATENT DOCUMENTS

| | | | | |
|---|---|---|---|---|
| 2006/0165293 A1* | 7/2006 | Hamanaka | ......... | G06K 9/00228 |
| | | | | 382/209 |
| 2009/0245576 A1* | 10/2009 | Hu | ......... | G06K 9/3233 |
| | | | | 382/103 |
| 2010/0208983 A1* | 8/2010 | Iwai | ......... | G06K 9/00228 |
| | | | | 382/159 |
| 2011/0052063 A1* | 3/2011 | McAuley | ......... | G06K 9/00684 |
| | | | | 382/180 |
| 2012/0148118 A1* | 6/2012 | Lee | ......... | G06K 9/00362 |
| | | | | 382/118 |
| 2013/0329964 A1* | 12/2013 | Nishi | ......... | G06K 9/00362 |
| | | | | 382/110 |
| 2015/0125073 A1* | 5/2015 | Hwang | ......... | G06K 9/46 |
| | | | | 382/159 |
| 2017/0301093 A1* | 10/2017 | Nakagomi | ......... | G06T 7/0016 |
| 2018/0146935 A1* | 5/2018 | Song | ......... | G06T 5/003 |
| 2019/0066373 A1* | 2/2019 | Tran | ......... | G06K 9/00785 |
| 2019/0147227 A1* | 5/2019 | Ko | ......... | G06K 9/4652 |
| | | | | 382/118 |
| 2019/0188488 A1* | 6/2019 | Ito | ......... | H04N 7/18 |
| 2020/0025877 A1* | 1/2020 | Sarkis | ......... | G01S 13/87 |
| 2020/0026928 A1* | 1/2020 | Rhodes | ......... | G06K 9/00718 |
| 2020/0134375 A1* | 4/2020 | Zhan | ......... | G06K 9/6259 |
| 2020/0134778 A1* | 4/2020 | He | ......... | G06T 11/001 |
| 2020/0202502 A1* | 6/2020 | Tsymbalenko | ......... | G06T 5/50 |
| 2020/0234068 A1* | 7/2020 | Zhang | ......... | G06K 9/6265 |
| 2020/0250462 A1* | 8/2020 | Yang | ......... | G06K 9/00362 |
| 2020/0250528 A1* | 8/2020 | van den Oord | ......... | G06N 3/0454 |
| 2020/0265255 A1* | 8/2020 | Li | ......... | G06K 9/6267 |
| 2020/0286263 A1* | 9/2020 | Li | ......... | G06T 11/001 |
| 2020/0302232 A1* | 9/2020 | Kilickaya | ......... | G06K 9/6256 |
| 2020/0327648 A1* | 10/2020 | Lin | ......... | G06T 5/007 |
| 2020/0334789 A1* | 10/2020 | Zhang | ......... | G06T 3/4046 |
| 2020/0349411 A1* | 11/2020 | Luo | ......... | G06N 3/0481 |
| 2020/0413070 A1* | 12/2020 | Huang | ......... | H04N 19/182 |
| 2021/0004625 A1* | 1/2021 | Zhang | ......... | G06K 9/4628 |
| 2021/0027426 A1* | 1/2021 | Ma | ......... | G06T 5/003 |
| 2021/0056668 A1* | 2/2021 | Barnes | ......... | G06T 7/30 |
| 2021/0056693 A1* | 2/2021 | Cheng | ......... | G06T 7/0012 |
| 2021/0082136 A1* | 3/2021 | Nikitidis | ......... | G06K 9/6256 |
| 2021/0089807 A1* | 3/2021 | Liu | ......... | G06N 3/08 |

* cited by examiner

IMAGE MANIPULATION USING DEEP LEARNING TECHNIQUES IN A PATCH MATCHING OPERATION

TECHNICAL FIELD

This disclosure relates generally to computer-implemented methods and systems for computer graphics processing. Specifically, the present disclosure involves image manipulation using deep learning techniques in a patch matching operation.

BACKGROUND

Image manipulation is the process of manipulating an image from one state to another. For example, image manipulation can include an image restoration process that is used to reproduce picture quality of an original image by removing or limiting noise present in a noisy image being restored. Existing image restoration techniques remove or limit noise in the noisy image using algorithms that require a hand-crafted design of a number of components (e.g., a patch distance metric that compares a small region of the noisy image with a reference image, a set of geometric transformations through which matches can be identified, post-processing voting operations to combine patches into a final restored image, and other design components). For example, a designer must manually configure parameters and variables of the restoration techniques.

The hand-crafted design of these manipulation techniques is both technically challenging for the designer and brittle during implementation. For example, the hand-crafted design may rely on complex parameter tuning that is specific to a particular noisy image and a particular reference image. Additionally, the brittleness of the hand-crafted design may result in failures of the manipulation technique when any changes to the task associated with the hand-crafted design arise. As a result, even a slight change to the task for which the hand-crafted technique was designed can cause the image manipulation technique to fail.

SUMMARY

Certain embodiments involve image manipulation using patch matching operations. In one example, a method includes generating, by one or more modules that include trainable components, (i) a query of a target image and (ii) a set of keys and a set of values of a first reference image. The method also includes generating matching costs by comparing the query of the set of queries of the target image with each key of the set of keys of the reference image and generating a set of weights from the matching costs. Further, the method includes generating a set of weighted values by applying each weight of the set of weights to a corresponding value of the set of values of the reference image. Furthermore, the method includes generating a weighted patch by adding each weighted value of the set of weighted values together. Additionally, the method includes generating a combined weighted patch by combining the weighted patch with additional weighted patches associated with additional queries of the target image and generating a manipulated image by applying the combined weighted patch to an image processing algorithm.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
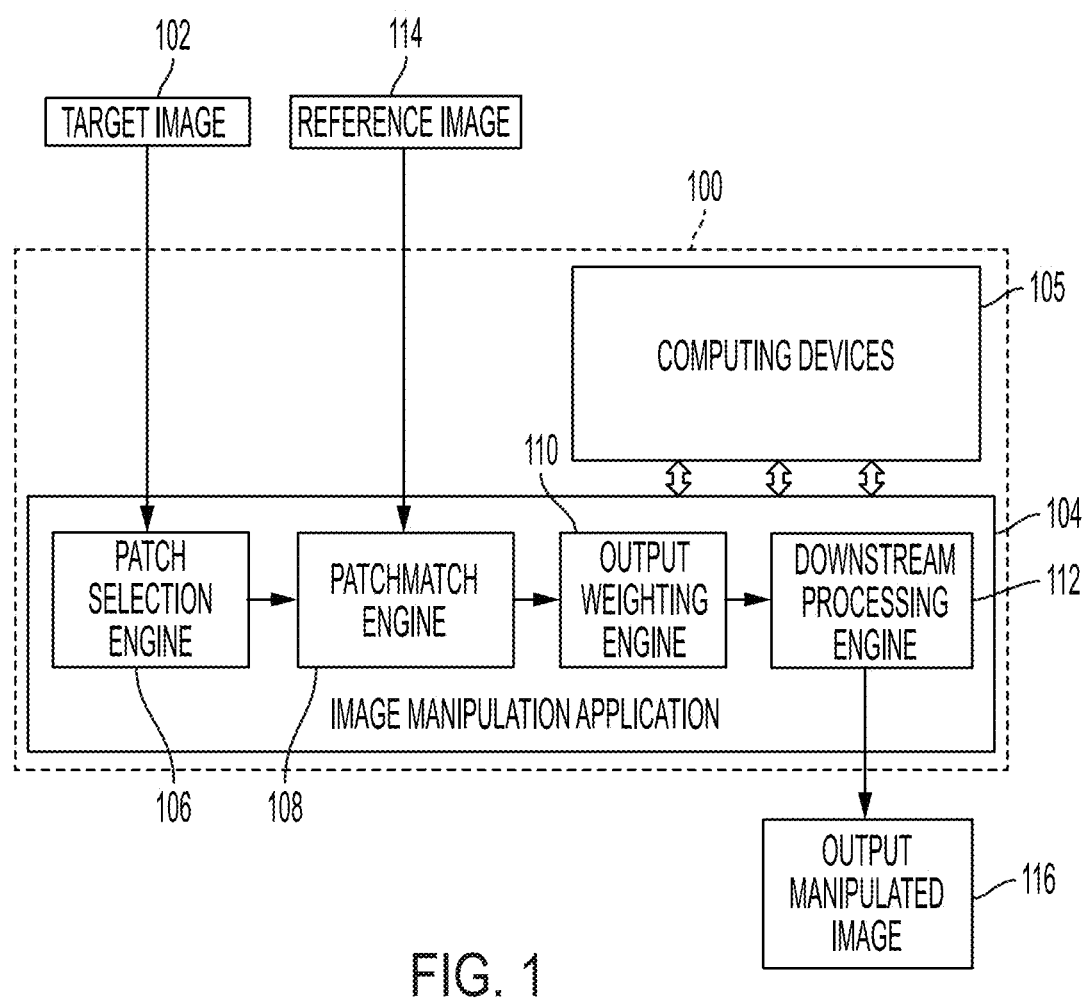
FIG. 1 depicts an example of a computing environment for performing a patch matching operation with deep learning techniques to manipulate a target image, according to certain embodiments of the present disclosure.

The present disclosure involves image restoration using deep learning techniques in a patch matching operation. As discussed above, existing image restoration methods often generate unsatisfactory results especially when changes to a task performed by the hand-crafted image restoration occur. That is, the image restoration methods may fail when components of the task, such as a patch distance metric, a set of geometric transformations, post-processing, voting operations, or other design components, are changed. Certain embodiments described herein address these limitations by employing a deep learning framework through a patch matching operation. For instance, an image manipulation application uses trainable convolutional neural networks (CNNs) to extract features from a target image and a reference image received by the image manipulation application. Features identified by the trainable CNNs in the target image and the reference image may be matched using an exemplary patch matching algorithm described herein. That is, for each patch of the target image, a corresponding patch is identified in the reference image. These patches are combined and fed through one or more additional trainable CNNs for post-processing, and a final restored image is output from the image manipulation application. In some examples, other machine learning networks may be used in place of or in addition to the CNNs.

Because the techniques described herein rely on deep learning algorithms, the techniques do not suffer from the brittle nature of the existing image restoration techniques. That is, the presently described techniques enables features of a patch matching operation to be learned in deep networks by making the patch matching operation differentiable. The differentiable patch matching operation is one that is able to rewrite itself based on information that the operation learns during training and use. Because the operation is rewritable during training and use, hand-crafting of the design of the patch matching operation and the brittle nature of the hand-crafted design are avoided.

Other embodiments of the techniques described herein include image transformation. In an example, image transformation involves transforming an artwork of a particular style to a style of a photograph or transforming a photograph to an artwork of a particular style. In such an example, a reference image is used to assist in the transformation process. Additional embodiments include: image inpainting using a reference image as a guide; stylizing simulations, such as fluid simulations; stylizing a specific domain of an image, such as face images, to look like artwork (or vice versa); finding dense correspondences between two photos; or estimating the pose of an object in a photograph by using a reference object as auxiliary information. In an example, the image may have also undergone geometric transformation, such as changes to the scale or rotation of the image, or a camera viewpoint of an image may be different.

The following non-limiting example is provided to introduce certain embodiments. In this example, an image manipulation application receives a target image that is provided for restoration (e.g., for removal of noise from the image). The image manipulation application also receives a reference image that is used by a patch matching operation to provide clarity to features of the target image. As used herein, the term "image" refers to a photo, a picture, a digital painting, a computer-generated graphic, or any other artifact that depicts visual perception. While this example generally describes removal of noise from the target image, the restoration process of the target image may also involve image transformations, changes in image styles, image inpainting, stylizing simulations, stylizing a specific domain of an image to look like artwork (or vice versa), finding dense correspondences between two photos, estimating the pose of an object in a photograph, or any other target image manipulation that is improved by a comparison with one or more reference images.

The image manipulation application may employ a patch selection engine to detect a set of queries for the target image. The set of queries may be feature vectors that numerically represent features of each image patch within the target image. The feature vector may be an n-dimensional vector of numerical features that represent an object of the target image. For example, features identified by the feature vectors may include an indication of a color section within a patch, an object depicted in the patch (e.g., a ball), or any other components of the target image that may be present in a particular patch. The image patches may represent segments of the target image (e.g., sections of 5 pixels by 5 pixels). In the example, the patch selection engine may receive the target image and generate the feature information at each pixel. The feature information at the pixel describes features of a patch of pixels surrounding the pixel. A convolutional neural network (CNN) may generate the feature information by processing a tensor (e.g., a representation of an image height, an image width, and color channels at each pixel) representing the target image into feature vectors for each pixel of the target image. Further, the image manipulation application may employ the patch selection engine to generate a set of keys of the reference image and a set of values of the reference image. The patch selection engine may also generate a set of values of the reference image.

A graphics processing unit (GPU) or central processing unit (CPU) implementation of a PatchMatch algorithm may be employed to compare the set of keys of the reference image to the queries of the target image to identify feature matches between the target image and the reference image. The PatchMatch algorithm is a general-purpose family of algorithms for finding dense matches between a pair (or multiple pairs) of images. Upon identifying the feature matches between the target image and the reference image, the PatchMatch engine set of values of the reference image are weighted by an output weighting engine. The weights applied to the set of values are based on the comparison between the target image and the reference image, and the weighted values are combined to generate a weighted patch. For example, the weights can be a function of the distance between the query and the keys, such that better matches receive greater weight than worse matches. The weighted patch includes a restored feature representation of a patch of the target image. The restored feature representation may avoid reproduction of the noise present in the target image.

A downstream processing engine may combine all of the weighted patches of the target image into an array or combination of weighted patches. The array of weighted patches may be represented by a tensor with dimensions that include a height of a restored image, a width of the restored image, and a dimension of the weighted values of the restored image. A downstream processing engine performs a post-processing operation on the array of weighted patches to generate the restored image. In an example, the downstream processing engine includes an additional trainable CNN.

In some scenarios, during a training operation, the restored image generated by the downstream processing engine is compared with a ground truth image. A loss value generated from this comparison may be used to train the trainable CNNs of the image manipulation application for subsequent iterations. This process may repeat until the restored image matches the ground truth image within a predetermined threshold. For example, a predetermined threshold may be when the loss generated by the comparison between the restored image and the ground truth image is less than 10%. Other predetermined thresholds may also be used depending on a desired accuracy of the restored image.

As described herein, certain embodiments provide improvements in image processing by restoring a target image using a deep learning techniques in a patch matching operation. The patch matching operation utilizes image features of a related reference image to restore a target image. A deep learning technique is employed with the patch matching operation to limit an amount of hand-crafting used to design the patch matching operation. For example, the deep learning technique is differentiable using training techniques, such as supervised learning, to avoid breakage of the patch matching operation when restoration tasks are changed or altered. The deep learning techniques used in the patch matching operation thus improves the visual quality of the restored image and avoid or even eliminate the challenges associated with other image restoration techniques.

As used herein, the term "target image" is used to refer to an image on which a patch matching operation is performed. Examples of the target image include, but are not limited to, images that are blurry, images with missing pixel information, images that have been transformed from their original state, any other images that include a noisy element with respect to quality of a ground truth image associated with the target image, or any other images where the patch matching operation is desired.

As used herein, the term "reference image" is used to refer to an image that is not noisy and includes features that are the same or similar to the features depicted in the target image. For example, the reference image may include a clear depiction of an animal that is also depicted in the target image. In some examples, the reference image may show the features from different angles or perspectives than the target image.

As used herein, the term "ground truth image" is used to refer to an image used in supervised training of a deep learning network that depicts the same features of the target image without being afflicted by noise or transformations. For example, the ground truth image may display a noise free version of the same image depicted in the target image.

As used herein, the term "tensor" is used to refer to a representation of n-dimensional grids. For example, in an image with three dimensions, the tensor can represent an image height, an image width, and number of color channels at each pixel. The tensor may be used to numerically represent the image prior to processing. Further, the tensor can have more or fewer than three dimensions.

As used herein, the term "matching cost" is used to refer to a representation of a difference between two image components. For example, the matching cost may include a patch loss that identifies a difference between a patch of a target image and a patch of a reference image, or the loss value may include an image loss between a manipulated image and a ground truth image.

As used herein, the term "query" is used to refer to a feature vector of a target image. For example, each pixel of the target image may include a query that is a feature vector that numerically represents a patch surrounding the pixel.

As used herein, the term "key" is used to refer to a feature vector of a reference image that is compared against a query of the target image. For example, each pixel of the reference image may include a feature vector that numerically represents a patch surrounding the pixel, and a set of these feature vectors are used as keys for comparison against one or more of the queries of the target image.

As used herein, the term "value" is used to refer to a feature vector of a reference image for the same pixels as the pixels used for the feature vectors of the set of keys. For example, a set of values may be equal to the set of keys, and the set of values may be used for generation of a manipulated image from the target image.

Example Operating Environment for Patch Matching Operations Using Deep Learning Techniques Referring now to the drawings, FIG. 1 depicts an example of a computing environment 100 for performing patch matching operations with deep learning techniques to manipulate a target image 102. The computing environment 100 includes an image manipulation application 104, which is executed by one or more computing devices 105. In some examples, the image manipulation application 104 is implemented using a computing network (e.g., a cloud computing network, software-as-a-service implementation). That is, the image manipulation application 104 may be hosted in the cloud or on a remote server and accessible by other computing devices. The image manipulation application 104 includes a patch selection engine 106, a PatchMatch engine 108, an output weighting engine 110, and a downstream processing engine 112. In an example, the one or more computing devices 105 may include a graphics processing unit (GPU).

The patch selection engine 106 receives the target image 102 to automatically analyze the target image 102 and identify patches within the target image 102 that are used as queries for a comparison with one or more reference images 114. While the reference image 114 is described as an individual reference image below, multiple reference images 114 may be used in the techniques described herein. In one example, the image manipulation application 104 receives the target image 102 or a reference to the target image 102 from a user. In another example, the image manipulation application 104 selects the target image 102 from a bank of images stored in a memory associated with the computing environment 100.

In an example, the patch selection engine 106 obtains features at each pixel of the target image 102. The features at each pixel may include a numerical representation of a region surrounding the pixel (i.e., a patch). A module with trainable components (e.g., a convolutional neural network (CNN)) of the patch selection engine 106 obtains the features from a tensor representing the target image 102. From the features generated by the CNN, the patch selection engine 106 selects a set of feature vectors (e.g., a 64 dimension vector) to be used as queries that represent patches within the target image 102. The patch selection engine 106 provides the queries to the PatchMatch engine 108 for comparison with keys generated from the reference image 114. As described below, the keys may be obtained in a similar manner as the queries. In an example, the queries provided to the PatchMatch engine 108 include queries for each of the pixels of the target image 102. In an example, a GPU or central processing unit (CPU) implementation of a PatchMatch algorithm of the PatchMatch engine 108 may be employed to compare the set of keys of the reference image to the queries of the target image to identify feature matches between the target image and the reference image.

In one or more examples, the PatchMatch engine 108 receives the one or more reference images 114 to generate a set of keys and values associated with the one or more reference images 114. The keys may represent a set of patches from the reference image 114 that are identified for comparison with the queries of the target image 102. The values may also represent the set of patches from the reference image 114 that are identified for comparison with the queries of the target image 102. While the keys are used for comparison with the queries, the values are weighted based on the comparison of the keys to the values, and used in the generation of a manipulated image 116. In some examples, the keys and the values are the same. In other examples, the keys and the values may have different dimensions. For example, a key may be a 64 dimension vector while a value may be a 128 dimension vector. Other vector dimensions may also be used for the keys and the values. To generate the keys and the values, the PatchMatch engine 108, or a separate patch selection engine 106, may provide a tensor representing the reference image 114 to one or more trainable CNNs. The trainable CNNs generate feature vectors of the reference image 114 at each pixel that describe the region surrounding the pixel (i.e., a patch). In an additional example, the values may be determined without using trainable components such as the CNNs. For example, the task of the system may be to predict pixel coordinates, and the values used in the task may only be coordinate values. In this example, the trainable CNNs are note used to output a patch representation for the value because only the coordinate is used to represent the value.

The PatchMatch engine 108 may generate a set of keys and a set of values from the patches generated for the reference image 114 for each individual patch of the target image 102. For example, the PatchMatch engine 108 may initialize a random set of keys for comparison with the queries and an associated set of values. The PatchMatch engine 108 may perform an interleaved jump flooding algorithm to identify subsequent keys and values in subsequent iterations of the patch matching operation until convergence is reached. In an example, convergence is reached when the matched patches from the reference image 114 to the target image 102 stop changing in subsequent iterations.

The interleaved jump flooding algorithm may interleave a propagation phase and a random searching phase. The propagation phase may include observing mappings from neighboring queries of the target image 102 to keys of the reference image 114. A determination is then made as to whether the mappings can be applied to the present query of the target image 102 for a better result than the current mapping of the query to a key of the reference image 114. In some examples, the propagation phase may look at mappings of a set of pixels a designated number of pixels away from the query pixel at which propagation is occurring. For example, the interleaved jump flooding algorithm may look at mappings of a set of pixels that are 8 pixels away from the query pixel above, below, and to either side of the query pixel (i.e., a first "jump"), then the algorithm may look at mappings of a set of pixels that are 4 pixels away from the query pixel (i.e., a second "jump"), then the algorithm may look at mappings of a set of pixels that are 2 pixels away from the query pixel (i.e., a third "jump"), and then the algorithm may look at mappings of a set of pixels that are adjacent to the query pixel (i.e., a fourth "jump"). As the algorithm works closer to the query pixel, the algorithm may update the mapping of the query pixel if a better mapping to a key of the reference image is observed. The term propagation indicates that good mappings for one patch can be propagated to neighboring patches to improve their own mappings. Thus, if a local maximum of correspondence exists in mappings of a neighborhood around the query, it can be detected in the propagation phase.

The random search phase may be interleaved with the propagation phase. For example, a random search phase may occur for each jump of the jump flooding algorithm (i.e., from 8 pixels, to 4 pixels, to 2 pixels, to adjacent pixels). At each of the pixels analyzed in the jumps of the propagation phase, the random search phase may generate one or more randomly selected mappings to the reference image 114 that are within a specified vicinity of the pixels within a specific jump. In this manner, the PatchMatch engine 108 is able to explore more of the image and identify any mappings to the reference image 114 that are better than the key to which the query currently maps. The interleaved jump flooding algorithm may result in a reduction of iterations for the patch matching operation to converge. As described above, the interleaved jump flooding algorithm is an iterative algorithm that updates a best guess about optimal mappings by exploring progressively closer neighboring pixels.

The set of values generated by the PatchMatch engine 108 from the reference image 114 that is associated with the set of keys may be weighted by the output weighting engine 110. The output weighting engine 110 weights the values based on the comparison between the query of the target image 102 and the keys of the reference image 114, as described below with respect to FIG. 4. The weighted values are combined to generate a weighted patch. The weighted patch includes a manipulated feature representation of a patch of the target image 102. The manipulated feature representation may avoid reproduction of the noise present in the target image.

The weighted patch is combined into a combined weighted patch of all of the weighted patches for the target image 102. The combined weighted patch is provided to the downstream processing engine 112. The downstream processing engine 112 may include an additional CNN that generates the manipulated image 116. The manipulated image 116 may include less noise than the target image 102. In an example, the manipulated image 116 may be fed into the patch selection engine 106 to perform another iteration of the patch matching operation. Further, in a training environment, the trainable CNNs may be trained based on a loss observed between the manipulated image 116 and a ground truth image associated with the target image 102.

Figure 2:
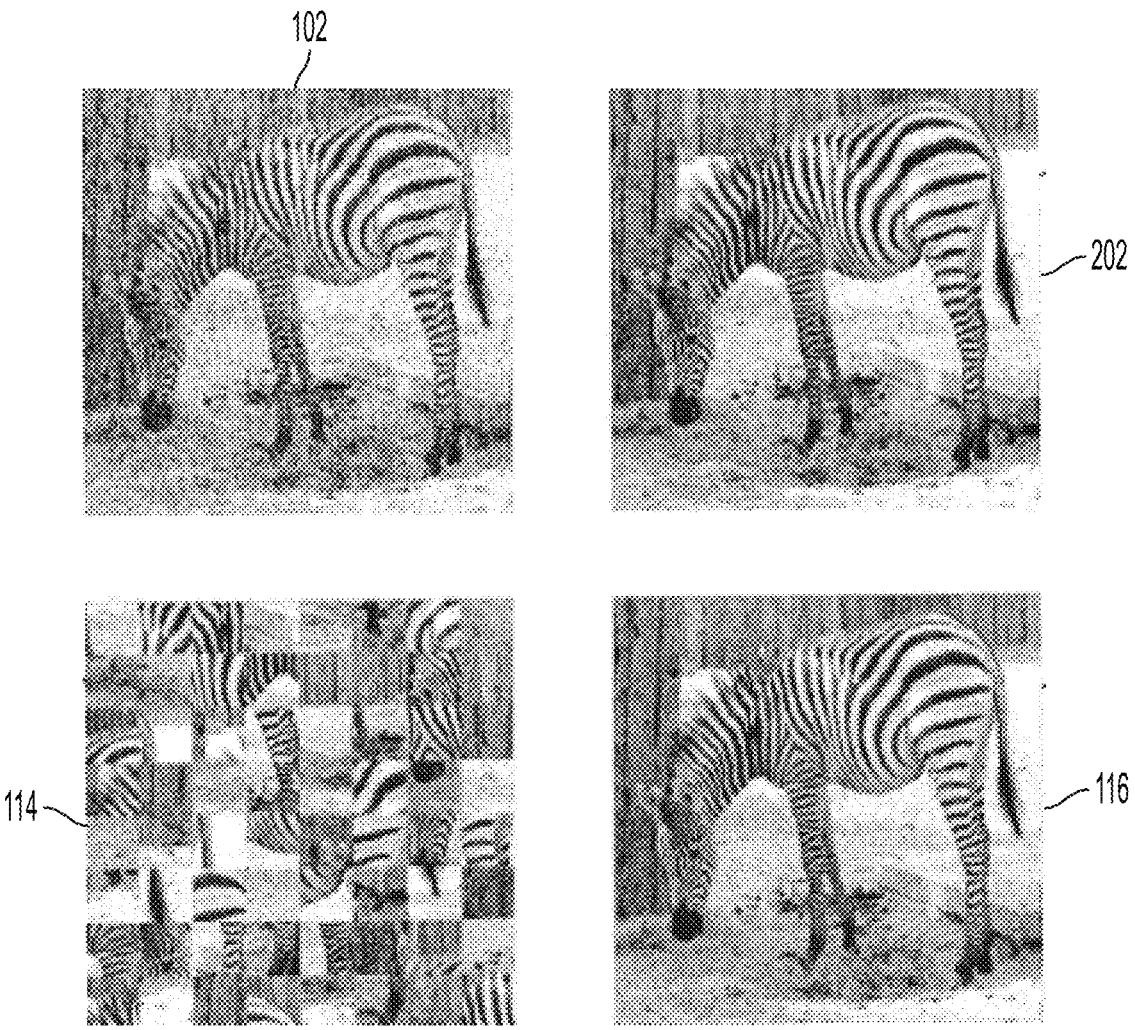
FIG. 2 depicts a simplified example of the patch matching operation of FIG. 1, according to certain embodiments of the present disclosure.

Examples of Computer-Implemented Operations for Patch Matching Operations Using Deep Learning Techniques FIG. 2 depicts a simplified example of the patch matching operation of FIG. 1. The image manipulation application 104 receives the target image 102 and the reference image 114 and generates the manipulated image 116. The target image 102 may be a low resolution image that results in a low quality display. As illustrated, the reference image 114 in this simplified example is a scrambled version of a ground truth image 202 of the target image 102. In other examples, the reference image 114 may be an image similar to the ground truth image 202 (e.g., displaying the same zebra), but be of a different size, be taken from a different angle, include more or less background information, etc. Further, the reference image 114 may include or comprise a series of images that are similar to the ground truth image 202 (e.g., different scenes from a movie depicting the same zebra).

The image manipulation application 104 is able to match queries representing patches from the target image 102 to keys representing patches of the reference image 114. By matching the queries to the keys, the image manipulation application 104 generates the manipulated image 116 with less noise than is present in the target image 102. Further, when training the image manipulation application 104 (e.g., training the CNNs), the ground truth image 202 may be used for supervised learning. For example, the image manipulation application 104 may compare the manipulated image 116 with the ground truth image 202 to generate a loss value between the two images. The CNNs of the image manipulation application 104 may be trained using the loss value such that the manipulated image 116 and the ground truth image 202 will have a smaller loss on a subsequent patch matching operation. After the trainable components (e.g., the CNNs) of the image manipulation application 104 are trained, the patch matching operation may be performed on target images 102 and reference images 114 when no corresponding ground truth image 202 is available, as described below with respect to FIGS. 3 and 4.

Figure 3:
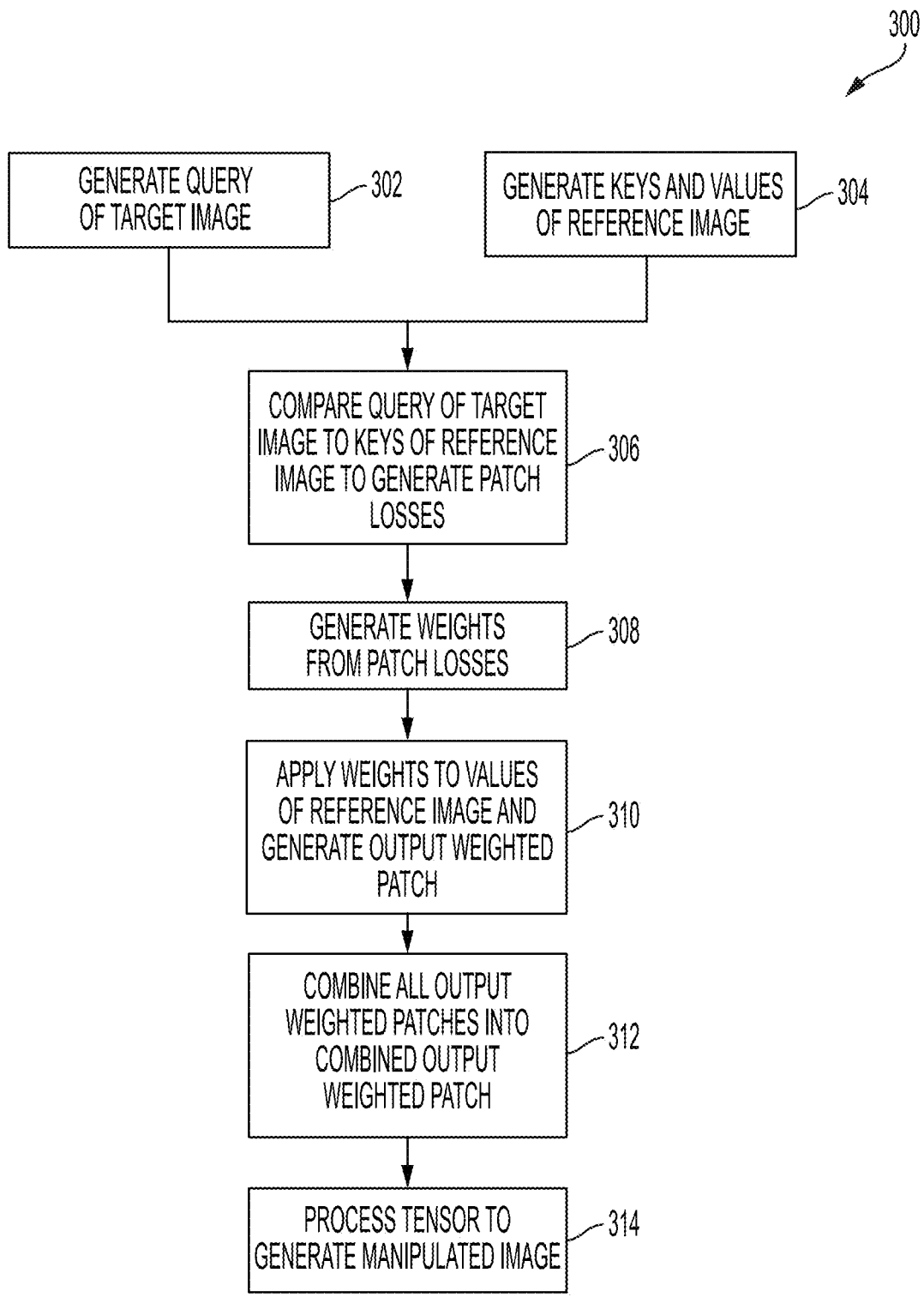
FIG. 3 depicts an example of a process for generating a manipulated image from the target image of FIG. 1 by performing a patch matching operation with deep learning techniques, according to certain embodiments of the present disclosure.

FIG. 3 depicts an example of a process 300 for generating the manipulated image 116 from the target image 102 by performing patch matching operations with deep learning techniques. The one or more computing devices 105 in the computing environment 100 implement operations depicted in FIG. 3 by executing suitable program code (e.g., the image manipulation application 104). For illustrative purposes, the process 300 is described with reference to certain examples depicted in the figures. Other implementations, however, are possible.

At block 302, the process 300 involves generating a query or a set of queries of the target image 102. For instance, the image manipulation application 104 can receive the target image 102, and the patch selection engine 106 can generate a set of queries that represent patches within the target image 102. In an example, the patch selection engine 106 provides the target image 102 to a CNN to generate a set of feature vectors for each pixel in the target image 102. The feature vectors describe a region (i.e., a patch) surrounding each pixel in the target image 102. A feature vector for a particular pixel is used as a query for a comparison with keys generated from the reference image 114.

At block 304, the process 300 involves generating a set of keys and a set of values corresponding to the set of keys of the reference image 114. For instance, the PatchMatch engine 108, or an additional patch selection engine 106, can generate the sets of keys and values that represent patches within reference image 116. In an example, the PatchMatch engine 108 or the additional patch selection engine 106 provides the reference image 114 to one or more CNNs to generate a set of feature vectors for each pixel in the reference image 114. The feature vectors describe a region (i.e., a patch) surrounding each pixel in the reference image 114. Feature vectors for particular pixels of the reference image 114 are used as keys for a comparison with the queries generated from the target image 102.

In an example, the PatchMatch engine 108 initially generates random sets of keys for comparison with the queries. The PatchMatch engine 108 may use an interleaved jump flooding algorithm in subsequent iterations of the process 300 to determine the set of keys used for the comparison with each of the queries of the target image 102. In an example, the interleaved jump flooding algorithm interleaves propagation phases with random search phases to identify the keys. The set of keys are associated with the corresponding set of values. The set of values may generally be the same as the keys (e.g., the values may be the same feature vectors as the keys), but in some instances the set of values may have a different dimension from the keys. For example, the set of values may have 128 dimensions while the set of keys may have 64 dimensions.

At block 306, the process 300 involves comparing a query of the target image 102 to the set of keys of the reference image 114 to generate matching costs. For instance, the output weighting engine 110 can take a dot product or an L2 distance of the feature vector of the query with the feature vectors of the keys. More generally, the comparison of the query to the set of keys may be a sum of (i) a bilinear form between the query and each key of the set of keys and (ii) a second bilinear form of each key with itself. In such a sum, bilinear form weights may be hand-specified or manually learned. That is, an inner product or a distance metric between the query and each key of the set of keys is determined, and the inner product or distance metric includes an equal weight for all input components, a hand-specified input weighting, or an input weighting that is learned by a trainable module. The dot product and the L2 distance described above are special cases of the bilinear forms. In other examples, the comparisons may be performed using a sum of squared differences between the query and the set of keys. The dot products or the sums of squared differences may provide indications of differences between the query and each of the keys. The differences may be referred to as matching costs.

At block 308, the process 300 involves generating weights from the matching costs. For instance, the output weighting engine 110 can provide the matching costs to a softmax function to generate a set of weights for each of the matching costs. A softmax function is a function that takes an input vector of K real numbers and normalizes the input vector into a probability distribution of K weights. That is, the weights generated from the input vector will add up to a total of one. Using the softmax function with an input vector of the matching costs, the key with a feature vector that is closest to the feature vector of the query generates the greatest weight.

At block 310, the process 300 involves applying the weights to the set of values of the reference image 114 to generate a weighted patch. For instance, the output weighting engine 110 can assign the weights generated at block 308 to the corresponding values. Assigning the weights to the corresponding values may include multiplying the feature vectors of the set of values by the corresponding weights. The weighted values may be added together to generate a weighted patch. Further, each query generated at block 302 may produce a weighted patch.

At block 312, the process 300 involves combining all of the weighted patches (e.g., for each of the queries generated at block 302) into a combined weighted patch. For instance, the output weighting engine 110 can combine the weighted patch for each pixel of the target image 102. The combined weighted patch may be a collection of vectors with a height and width of the target image 102 and a depth corresponding to the dimension values of the feature vectors of the weighted patches.

At block 314, the process 300 involves processing the combined weighted patch to generate the manipulated image 116. For instance, the downstream processing engine 112 may provide the weighted patch to a CNN that generates the manipulated image 116. Other image processing algorithms may also be used in place of the CNN. In an example, the process 300 may be repeated where the queries are generated from the manipulated image 116 at block 302. Further, the keys and values of the reference image 114 in subsequent iterations of the process 300 may be generated using the interleaved jump flooding algorithm. Additional iterations of the process 300 may be repeated until the manipulated image 116 converges.

While the process 300 is described with respect to restoring image quality of a two-dimensional image, other applications for the process 300 are also possible. For example, the process 300 could be applied to three-dimensional images. In such an example, the process 300 performs shape analysis to restore the image quality of the three-dimensional image.

Figure 4:
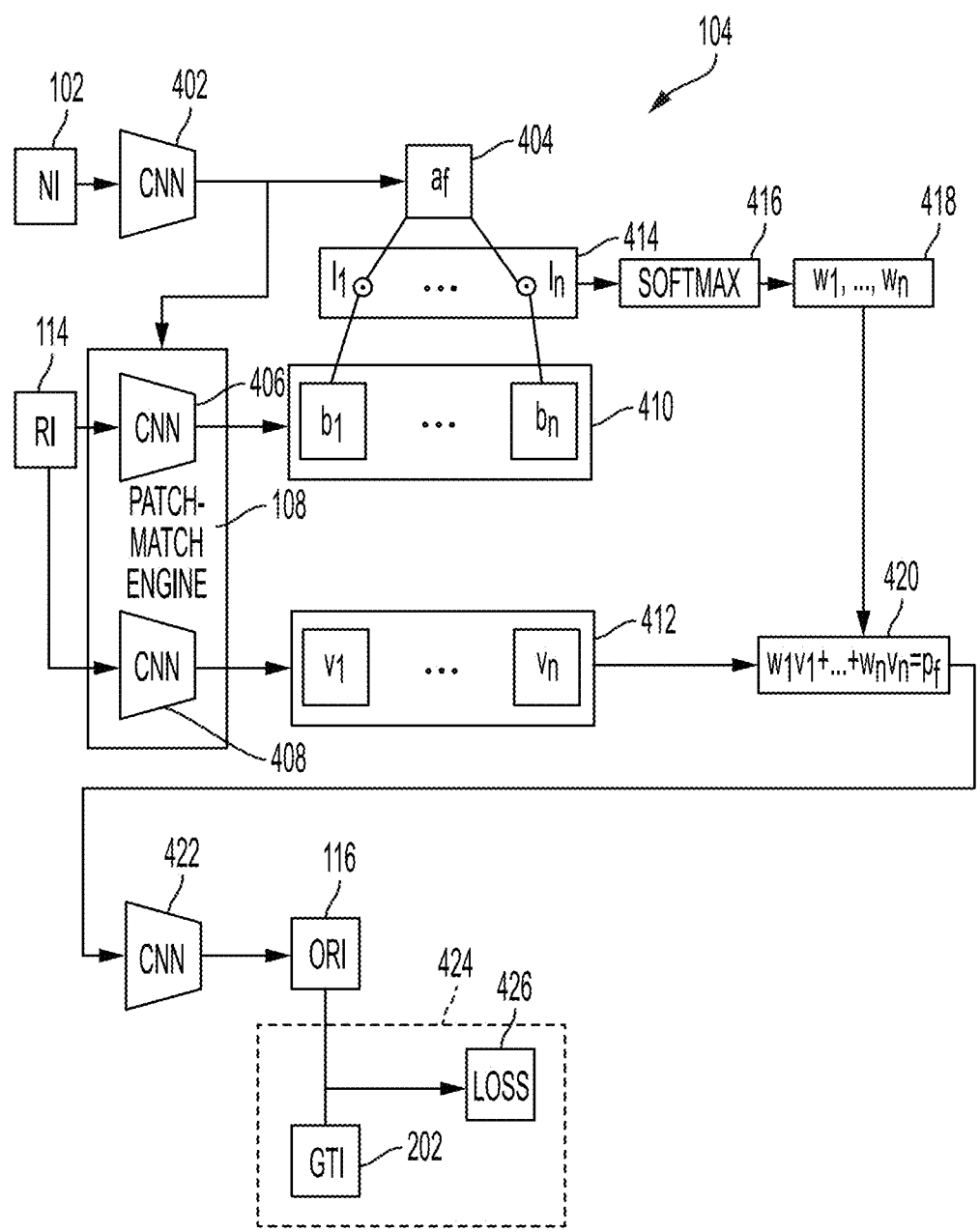
FIG. 4 depicts an example of a schematic representation of an image manipulation application, according to certain embodiments of the present disclosure.

FIG. 4 depicts an example of a schematic representation of the image manipulation application 104. In the example shown in FIG. 4, the target image 102 is received at a first module with trainable components, such as a CNN 402. The CNN 402 may be part of the patch selection engine 106, as described above with respect to FIG. 1. In an example, the CNN 402 receives the target image 102 as a tensor representation of the target image, and the CNN 402 outputs a set of feature vectors. The feature vectors provide vector representations of features of regions surrounding pixels within the target image 102. That is the feature vectors provide vector representations of image patches in the target image 102. In the illustrated example, only a single feature vector 404 is presented, but the CNN 402 may generate a feature vector for each pixel of the target image 102.

The PatchMatch engine 108 receives the reference image 114 and processes the reference images using a second module with trainable components, such as a pair of CNNs 406 and 408. In some examples, the CNNs 406 and 408 may be implemented separately from the PatchMatch engine 108. For example, the CNNs 406 and/or 408 may be implemented by one or more other computing devices 105 of the computing environment 100. Further, in some examples, only a single CNN 406 may be used to process the reference image 114. That is, the CNN 406 may output all of the feature vectors of the reference image 114, and a set of keys and a set of values may be selected from the output of the CNN 406. The CNNs 406 and 408 generate feature vectors of the reference image 114 in a similar manner to the CNN 402 generating feature vectors for the target image 102. Using two separate CNNs 406 and 408 may enable generation of feature vectors used for the keys that have a different vector dimension than the feature vectors used for the values. In some examples, a single module with trainable components (e.g., the CNN 402) may be used to generate all of the queries, the keys, and the values.

Using the feature vectors of the reference image 114, the PatchMatch engine 108 generates a set of keys 410 and a set of values 412. The set of keys 410 and the set of values 412 are generally equal to one another, although the vectors of the keys 410 may have different dimensions from the vectors of the values 412. For example, the keys 410 may have 64 dimension vectors while the values 412 may have 128 dimension vectors. In an example, the PatchMatch engine 108 may randomly assign a set of patches (i.e., feature vectors) from the reference image 114 as the keys 410 for comparison with the feature vector 404 of the target image 102. The PatchMatch engine 108 may also generate the values 412 that correspond to the keys 410. As an example, when patches for three pixels are selected by the PatchMatch engine 108 for use as the keys 410, patches for the same three pixels are selected by the PatchMatch engine 10 for use as the values 412. In subsequent iterations of the patch matching operation, the PatchMatch engine 108 may use an interleaved jump flooding algorithm, which interleaves a propagation phase and a random search phase, to identify the set of keys 410 used in the subsequent iterations for comparison with the feature vector 404. Similarly, the PatchMatch engine 108 identifies a new set of values 412 that corresponds to the new set of keys 410.

The comparison of the feature vector 404 with the keys 410 may be performed by taking a dot product of the feature vector 404 and each of the keys 410. In other examples, the dot product could be substituted with a sum of squared difference between the feature vector 404 and each of the keys 410. In either example, the comparison generates a set of matching costs 414 that indicate differences between the feature vector 404 and the keys 410. These matching costs 414 are provided to a softmax function 416 to generate a set of weights 418 associated with each of the keys 410. The total combination of the weights 418 generated using the softmax function 416 will be equal to a total of one. That is, each of the weights identify a probability of a key 410 being a match with the feature vector 404. In some examples, a temperature division or temperature annealing technique may be implemented on the matching costs 414 prior to applying the softmax function 416. Using a temperature division technique, the image manipulation application 104 is able to determine how soft or sharp the softmax function 418 will be.

For example, when the softmax is 'sharp' we effectively increase a 'contrast' between different matching cost values, which has the effect of being sensitive to poor matches. Because of this sensitivity to poor matches when the softmax is 'sharp,' a 'soft' softmax is used at initialization of the optimization (i.e., the softmax is initialized as lenient to bad matches returned by the algorithm). But, as the optimization progresses, the PatchMatch algorithm may become more demanding about the quality of the match. Accordingly, the temperature of the softmax is tuned to make the softmax operator sharper as the iterations of the PatchMatch algorithm progress.

As discussed above, the values 412 correspond to the keys 410. For example, the values 412 may be the same as the keys 410. In some examples, the values 412 and the keys 410 may be associated with the same patches of the reference image 114, but a dimension of the vectors in the keys 410 may be larger or smaller than a dimension of the vectors in the values 412.

Because the values 412 correspond to the keys 410, the weights 418 are applied to the values 412 to determine a weighted patch 420. The weighted patch 420 may be obtained by multiplying each of the values $v_1$ $v_n$ of the set of values 412 by a corresponding weight $w_1$ $w_n$ of the set of weights 418. The resulting weighted values are added together to generate the weighted patch 420. Because a key 410 that is similar to a feature vector 404 of the target image 102 will have a much larger weight than the remaining keys, the weighted patch 420 will be very similar to the value 412 associated with the key 410 that is similar to the feature vector 404.

All of the weighted patches 420 for the target image 102 are combined to generate a combined weighted patch, and the combined weighted patch is provided to a CNN 422. The CNN 422 generates the manipulated image 116 from the combined weighted patch. In some examples, the CNN 422 may be replaced with other image processing algorithms that are capable of generating the manipulated image 116 from the combined weighted patch.

In an example, a subsequent iteration of the patch matching operation may begin when the CNN 402 receives the manipulated image 116. The iterations may continue until convergence is reached. That is, the iterations may continue until the manipulated image 116 is stops changing or until a change threshold is reached for the manipulated image 116. In some examples, when less than 1% of the manipulated image 116 changes during an iteration, the patch matching operation may be considered to have reached convergence and the iterations of the patch matching operation may stop. Other change thresholds may also be used depending on a desired image quality of the manipulated image 116.

Again, in a training environment, an optional supervision engine 424 may compare the manipulated image 116 to the ground truth image 202. The comparison between the two images 116 and 202 may generate a loss 426. In an example, the loss 426 may be used by the supervision engine 424 to train the CNNs 402, 406, 408, and 422 of the image manipulation application 104. Other trainable components of the image manipulation application 104 may also be trained based on the loss 426.

Figure 5:
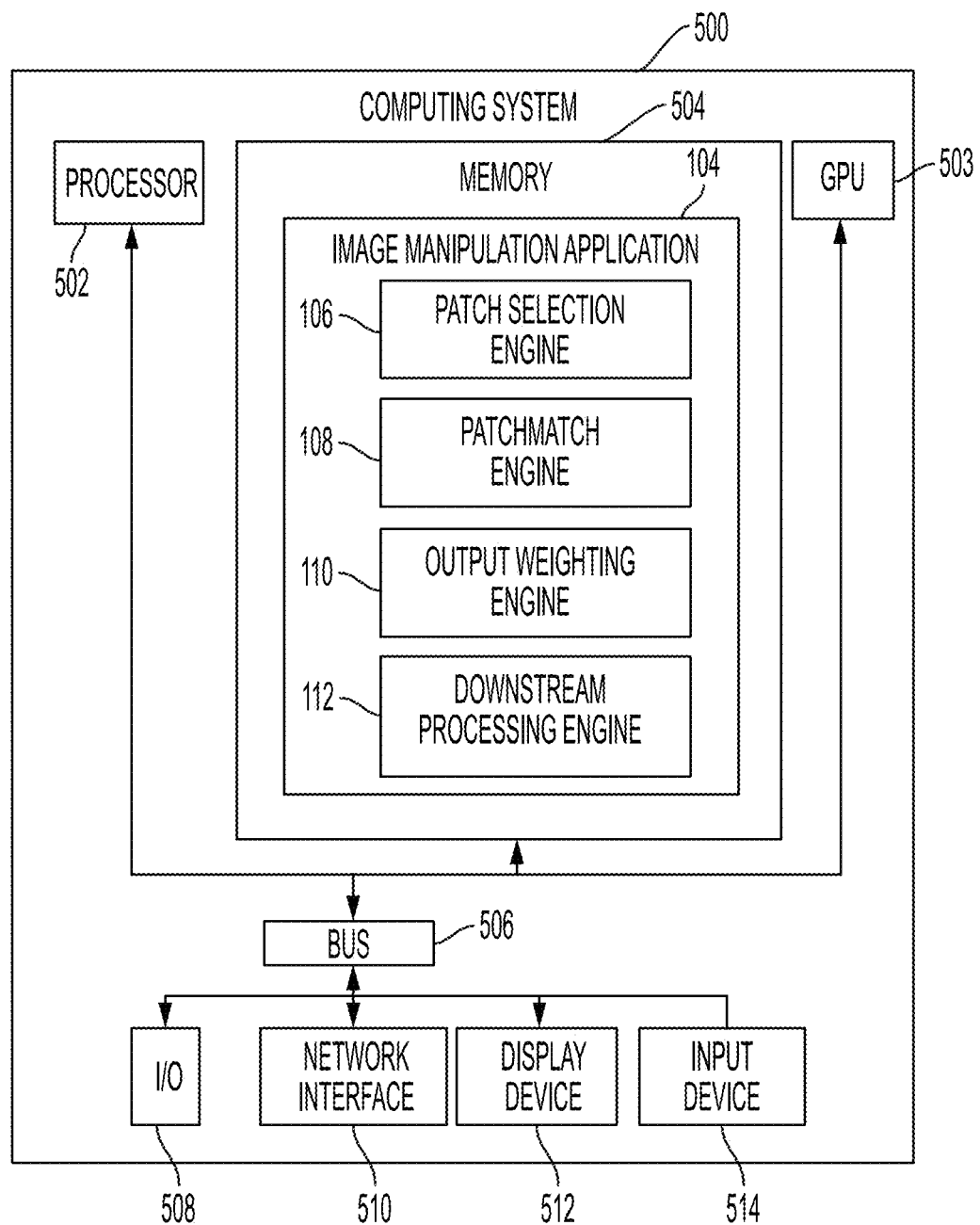
FIG. 5 depicts an example of a computing system that executes an image manipulation application for performing certain embodiments of the present disclosure.

Computing System Example for Generating a Manipulated Image Using a Patch Matching Operation with Deep Learning Techniques Any suitable computing system or group of computing systems can be used for performing the operations described herein. For example, FIG. 5 depicts an example of a computing system 500 that can implement the computing environment of FIG. 1. In some embodiments, the computing system 500 includes a processor 502 that executes the image manipulation application 104, a memory 504 that stores various data computed or used by the image manipulation application 104, an input device 514 (e.g., a mouse, a stylus, a touchpad, a touchscreen, etc.), and a display device 512 that displays graphical content generated by the image manipulation application 104. For illustrative purposes, FIG. 5 depicts a single computing system on which the image manipulation application 104 is executed, and the input device 514 and display device 512 are present. But these applications, datasets, and devices can be stored or included across different computing systems having devices similar to the devices depicted in FIG. 5.

The depicted example of a computing system 500 includes a processor 502 communicatively coupled to one or more memory devices 504. The processor 502 executes computer-executable program code stored in a memory device 504, accesses information stored in the memory device 504, or both. Examples of the processor 502 include a microprocessor, an application-specific integrated circuit ("ASIC"), a field-programmable gate array ("FPGA"), or any other suitable processing device. The processor 502 can include any number of processing devices, including a single processing device. In an example, the computing system 500 includes a GPU 503. In another example, the processor 502 can be configured to perform the functions of the GPU 503 described herein (e.g., by causing the processor 502 to execute specialize graphics processing software).

The memory device 504 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 500 may also include a number of external or internal devices, such as an input device 514, a display device 512, or other input or output devices. For example, the computing system 500 is shown with one or more input/output ("I/O") interfaces 508. An I/O interface 508 can receive input from input devices or provide output to output devices. One or more buses 506 are also included in the computing system 500. The buses 506 communicatively couples one or more components of a respective one of the computing system 500.

The computing system 500 executes program code that configures the processor 502 to perform one or more of the operations described herein. The program code includes, for example, the image manipulation application 104 or other suitable applications that perform one or more operations described herein. The program code may be resident in the memory device 504 or any suitable computer-readable medium and may be executed by the processor 502 or any other suitable processor. In some embodiments, all modules in the image manipulation application 104 (e.g., the patch selection engine 106, the PatchMatch engine 108, the output weighting engine 110, the downstream processing engine 112, etc.) are stored in the memory device 504, as depicted in FIG. 5. In additional or alternative embodiments, one or more of these modules from the image manipulation application 104 are stored in different memory devices of different computing systems.

In some embodiments, the computing system 500 also includes a network interface device 510. The network interface device 510 includes any device or group of devices suitable for establishing a wired or wireless data connection to one or more data networks. Non-limiting examples of the network interface device 510 include an Ethernet network adapter, a modem, and/or the like. The computing system 500 is able to communicate with one or more other computing devices (e.g., a computing device that receives inputs for image manipulation application 104 or displays outputs of the image manipulation application 104) via a data network using the network interface device 710.

An input device 514 can include any device or group of devices suitable for receiving visual, auditory, or other suitable input that controls or affects the operations of the processor 502. Non-limiting examples of the input device 514 include a touchscreen, stylus, a mouse, a keyboard, a microphone, a separate mobile computing device, etc. A display device 512 can include any device or group of devices suitable for providing visual, auditory, or other suitable sensory output. Non-limiting examples of the display device 512 include a touchscreen, a monitor, a separate mobile computing device, etc.

Although FIG. 5 depicts the input device 514 and the display device 512 as being local to the computing device that executes the image manipulation application 104, other implementations are possible. For instance, in some embodiments, one or more of the input device 514 and the display device 512 can include a remote client-computing device that communicates with the computing system 500 via the network interface device 510 using one or more data networks described herein.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A non-transitory computer-readable medium having program code that is stored thereon, the program code executable by one or more processing devices for performing operations comprising:
   generating, by one or more modules that include trainable components, (i) a query of a target image and (ii) a set of keys and a set of values of a first reference image;
   generating matching costs by comparing the query of the target image with each key of the set of keys of the reference image;
   generating a set of weights from the matching costs;
   generating a set of weighted values by applying each weight of the set of weights to a corresponding value of the set of values of the reference image;
   generating a weighted patch by adding each weighted value of the set of weighted values together;
   generating a combined weighted patch by combining the weighted patch with additional weighted patches associated with additional queries of the target image; and
   generating a manipulated image by applying the combined weighted patch to an image processing algorithm.

2. The non-transitory computer-readable medium of claim 1, wherein the one or more modules that include trainable components comprise a first convolutional neural network that generates the query, a second convolutional neural network that generates the set of keys, and a third convolutional neural network that generates the set of values.

3. The non-transitory computer-readable medium of claim 2, wherein the image processing algorithm comprises a fourth convolutional neural network.

4. The non-transitory computer-readable medium of claim 3, further comprising:
   generating a loss value by comparing the manipulated image to a ground truth image; and
   training the first convolutional neural network, the second convolutional neural network, the third convolutional neural network, the fourth convolutional neural network, or any combination thereof using the loss value.

5. The non-transitory computer-readable medium of claim 1, wherein the set of keys and the set of values are generated using an interleaved jump flooding algorithm.

6. The non-transitory computer-readable medium of claim 5, wherein the interleaved jump flooding algorithm interleaves a propagation phase with a random search phase.

7. The non-transitory computer-readable medium of claim 1, wherein the matching costs are generated by calculating an inner product or a distance metric between the query and each key of the set of keys, wherein the inner product or distance metric comprise an equal weight for all input components, a hand-specified input weighting, or an input weighting that is learned by a trainable module.

8. The non-transitory computer-readable medium of claim 1, wherein generating the set of weights from the matching costs comprises applying a softmax function to the matching costs.

9. The non-transitory computer-readable medium of claim 1, wherein the set of keys and the set of values comprise individual keys and individual values from both the first reference image and a second reference image.

10. A computer-implemented method in which one or more processing devices perform operations comprising:
    generating, by one or more modules that include trainable components, (i) a query of a target image and (ii) a set of keys and a set of values of a first reference image;
    generating matching costs by comparing the query of the target image with each key of the set of keys of the reference image;
    generating a set of weights from the matching costs;
    generating a set of weighted values by applying each weight of the set of weights to a corresponding value of the set of values of the reference image;
    generating a weighted patch by adding each weighted value of the set of weighted values together;
    generating a combined weighted patch by combining the weighted patch with additional weighted patches associated with additional queries of the target image; and
    generating a manipulated image by applying the combined weighted patch to an image processing algorithm.

11. The computer-implemented method of claim 10, wherein the one or more modules that include trainable components comprise a first convolutional neural network that generates the query, a second convolutional neural network that generates the set of keys, and a third convolutional neural network that generates the set of values.

12. The computer-implemented method of claim 11, wherein the image processing algorithm comprises a fourth convolutional neural network.

13. The computer-implemented method of claim 12, further comprising:
    generating a loss value by comparing the manipulated image to a ground truth image; and
    training the first convolutional neural network, the second convolutional neural network, the third convolutional neural network, the fourth convolutional neural network, or any combination thereof using the loss value.

14. The computer-implemented method of claim 10, wherein the set of keys and the set of values are generated using an interleaved jump flooding algorithm.

15. The computer-implemented method of claim 10, wherein generating the set of weights from the matching costs comprises applying a softmax function to the matching costs.

16. A computing system comprising:
    means for generating, by one or more modules that include trainable components, (i) a query of a target image and (ii) a set of keys and a set of values of a first reference image;
    means for generating matching costs by comparing the query of the target image with each key of the set of keys of the reference image;
    means for generating a set of weights from the matching costs;

means for generating a set of weighted values by applying each weight of the set of weights to a corresponding value of the set of values of the reference image;

means for generating a weighted patch by adding each weighted value of the set of weighted values together;

means for generating a combined weighted patch by combining the weighted patch with additional weighted patches associated with additional queries of the target image; and means for generating a manipulated image by applying the combined weighted patch to an image processing algorithm.

17. The computing system of claim 16, wherein the one or more modules that include trainable components comprise a first convolutional neural network that generates the query, a second convolutional neural network that generates the set of keys, and a third convolutional neural network that generates the set of values.

18. The computing system of claim 17, further comprising:

means for generating a loss value by comparing the manipulated image to a ground truth image; and means for training the first convolutional neural network, the second convolutional neural network, the third convolutional neural network, or any combination thereof using the loss value.

19. The computing system of claim 16, wherein the set of keys and the set of values are generated using an interleaved jump flooding algorithm.

20. The computing system of claim 16, wherein the set of keys and the set of values comprise individual keys and individual values from both the first reference image and a second reference image.

* * * * *